(12) United States Patent
Zhang (10) Patent No.: US 11,066,119 B2
(45) Date of Patent: Jul. 20, 2021

(54) FOLDING SCOOTER FRAME

(71) Applicant: DONGGUAN PRESTIGE SPORTING PRODUCTS CO., LTD., Dongguan (CN)

(72) Inventor: Zhao Zhang, Dongguan (CN)

(73) Assignee: DONGGUAN PRESTIGE SPORTING PRODUCTS CO., LTD., Dongguan (CN)

( * ) Notice: Subject to any disclaimer, the term of this patent is extended or adjusted under 35 U.S.C. 154(b) by 311 days.

(21) Appl. No.: 16/318,248

(22) PCT Filed: Jan. 19, 2017

(86) PCT No.: PCT/CN2017/071687
§ 371 (c)(1),
(2) Date: Jan. 16, 2019

(87) PCT Pub. No.: WO2018/014526
PCT Pub. Date: Jan. 25, 2018

(65) Prior Publication Data
US 2019/0168837 A1    Jun. 6, 2019

(30) Foreign Application Priority Data

Jul. 21, 2016  (CN) .......................... 201610580160.7

(51) Int. Cl.
*B62K 15/00* (2006.01)
*B62K 5/00* (2013.01)
(Continued)

(52) U.S. Cl.
CPC ............ *B62K 15/006* (2013.01); *B62K 5/007* (2013.01); *B62K 21/16* (2013.01); *B62K 2202/00* (2013.01); *B62K 2204/00* (2013.01)

(58) Field of Classification Search
CPC .... B62K 15/00; B62K 15/006; B62K 15/008; B62K 2015/005; B62D 31/006
See application file for complete search history.

(56) References Cited

U.S. PATENT DOCUMENTS 8,720,995 B2 * 5/2014 Wu ...................... B62K 15/008
297/334
8,746,730 B2 * 6/2014 Wu ...................... B62K 15/008
280/639
(Continued)

FOREIGN PATENT DOCUMENTS

CN       103158819 A     6/2013
CN       203381743 U     1/2014
(Continued)

*Primary Examiner* — Barry Gooden, Jr.
(74) *Attorney, Agent, or Firm* — Shimokaji IP (57) ABSTRACT

A folding scooter frame (100) includes a front vehicle frame (110), a rear vehicle frame (120) and a folding seat support frame (8). The front vehicle frame (110) and the rear vehicle frame (120) are pivotally connected. The folding seat support frame (8) includes a linkage rod (81) and a frame body, wherein a front end of the linkage rod (81) is connected with the front vehicle frame (110), a rear end of the linkage rod (81) is pivotally connected with the frame body, and the linkage rod (81) is able to swing as the front vehicle frame (110) is folded and thus drives the frame body to fold. The folding scooter frame (100) has the advantages of quick and convenient folding operations.

18 Claims, 10 Drawing Sheets

(51) Int. Cl.
*B62K 5/007* (2013.01)
*B62K 21/16* (2006.01)

(56) References Cited

U.S. PATENT DOCUMENTS

| | | | |
|---|---|---|---|
| 10,689,053 B2* | 6/2020 | Zhang | B62K 15/006 |
| 10,729,603 B2* | 8/2020 | Wang | A61G 5/0841 |
| 10,773,767 B2* | 9/2020 | Zhang | B62K 15/008 |
| 2005/0077097 A1* | 4/2005 | Kosco | B62K 15/006 |
| | | | 180/208 |
| 2012/0242059 A1* | 9/2012 | Wu | B62K 15/00 |
| | | | 280/287 |
| 2012/0242117 A1* | 9/2012 | Wu | B62K 15/008 |
| | | | 297/188.01 |
| 2013/0062846 A1* | 3/2013 | Hsiao | B62K 15/00 |
| | | | 280/87.05 |
| 2014/0125036 A1 | 5/2014 | Wu | |
| 2016/0089285 A1 | 3/2016 | Cheng | |
| 2018/0271726 A1* | 9/2018 | Wang | A61G 5/128 |
| 2019/0241230 A1* | 8/2019 | Zhang | A61G 5/045 |
| 2019/0283831 A1* | 9/2019 | Zhang | B62K 3/16 |
| 2020/0017159 A1* | 1/2020 | Zhang | B62K 15/00 |

FOREIGN PATENT DOCUMENTS

| | | | |
|---|---|---|---|
| CN | 104097725 A | 10/2014 | |
| CN | 104691683 A | 6/2015 | |
| CN | 204659922 U | 9/2015 | |
| CN | 105314029 A | 2/2016 | |
| CN | 105501365 A | 4/2016 | |
| CN | 205916266 U | 2/2017 | |
| WO | 03037678 A2 | 5/2003 | |
| WO | 2011161335 A1 | 12/2011 | |

* cited by examiner

FOLDING SCOOTER FRAME

FIELD OF THE INVENTION

The present invention relates to a folding scooter, and more particularly to a folding scooter frame with quick and convenient folding and unfolding operations.

BACKGROUND OF THE INVENTION

Currently, the existing folding electric scooters are manually folded, which have complicated folding and unfolding operations. The folding step is cumbersome, and the folding speed is slow, which is quite inconvenient. Further, for people with mobility difficulties, manual operation spends a lot of time and effort, thus it is inconvenient for those who are physically disabled.

SUMMARY OF THE INVENTION

One objective of the present invention is to provide a folding scooter frame with quick and convenient folding and unfolding operations.

To achieve the above-mentioned objective, the present invention provides a folding scooter frame including a front frame, a rear frame pivotally connected with the front frame, and a folding seat support frame comprising a linkage rod and a frame body. The linkage rod has a front end connected with the front frame and a rear end pivotally connected with the frame body, and the linkage rod is rotatable as the front frame is folded, thereby driving the frame body to fold.

In comparison with the prior art, the front end of the linkage rod is connected to the front frame, and the rear end of the linkage rod is pivotally connected with the frame body, thus the linkage rod is rotatable as the front frame is folded or unfolded, thereby driving the frame body and the seat to fold, therefore the folding and unfolding operations are simplified and convenient.

Preferably, the frame body comprises a first support rod, a second support rod, a third support rod and a seat, the first support rod is pivotally connected with the second support rod, a lower end of the third support rod is pivotally connected with the second support rod, two ends of the seat are pivotally connected with upper ends of the first support rod and the third support rod respectively, a lower end of the second support rod is pivotally connected with the rear frame, and the rear end of the rear frame is pivotally connected with a lower end of the first support rod via a pivot shaft.

Preferably, the frame body comprises a first support rod, a second support rod, and a seat, the first support rod is pivotally connected with the second support rod, the seat is a telescopic structure, two ends of the seat are pivotally connected with upper ends of the first support rod and the second support rod respectively, a lower end of the second support rod is pivotally connected with the rear frame, and the rear end of the rear frame is pivotally connected with a lower end of the first support rod via a pivot shaft.

Preferably, the front frame comprises a front beam, a front bar and a front cross bar, a rear end of the front beam is pivotally connected with a front end of the rear frame, a front end of the front bar is pivotally connected with the front cross bar, the front beam has a mounting frame, the front end of the linkage rod is pivotally connected with the mounting frame, and a rear end of the front bar is pivotally connected with the linkage rod.

Preferably, the folding seat support frame further comprises a limiting rod, one end of the limiting rod is fixed on the pivot shaft which is supported on an upper surface of the rear frame, and the limiting rod is bent and has another end pivotally connected with the rear frame.

Preferably, the frame body comprises a backrest rod and a backrest pull rod, a lower end of the backrest rod is pivotally connected with the second support rod, one end of the backrest pull rod is connected with the backrest rod, and another end of the backrest pull rod is connected with the seat. By setting the backrest pull rod, the backrest rod can be folded automatically when the seat is folded.

Preferably, the folding scooter frame further comprises a folding driving mechanism which comprises a drive rod and a pull rod, wherein the drive rod is pivotally connected with the rear frame via a center shaft, one end of the pull rod is pivotally connected with the front frame, another end of the pull rod is pivotally connected with the drive rod to cause the drive rod to swing thereby actuating the pull rod and therefore pivoting and folding the front frame relatively to the rear frame.

Specifically, the folding driving mechanism further comprises a first hook, a first elongated slot is provided at one end of the pull rod, a first shaft pin is provided at a lower end of the drive rod to insert into the first long hole, one end of the first hook is pivotally connected with the front frame and another end of the first hook is hooked on the front frame, and a second shaft pin is provided at a middle of the drive rod to press against the first hook; before folding, the drive rod swings to cause the second shaft pin to push the first hook to disengage from the rear frame, thereby folding the front frame relatively to the rear frame. Since the drive rod is pivoted on the rear frame, the pull rod is pivoted on the front frame, the first elongated slot is formed at the end of the pull rod, and the first shaft pin of the drive rod is inserted into the first elongated slot. Further, the first hook is hooked on the rear frame, and the second shaft pin of the drive rod is pressed against the first hook, thus the front frame and the rear frame are locked in the unfold position. When folding, the drive rod is driven to swing to cause the first hook to disengage from the rear frame, thereby unlocking the front frame and the rear frame; continuing to swing the drive rod, the pull rod is linked, so that the front frame and the rear frame can be folded. By this token, the folding frame can be folded or unfolded quickly only by driving the drive rod, and the operation is simple and convenient.

Specifically, the folding driving mechanism further comprises a first tension spring arranged between the front frame and the first hook. By means of the first tension spring, the first hook can hook on the center shaft automatically when the front frame and the rear frame are completely unfolded, so that the rear frame can be locked thereby preventing an unexpected folding and improving safety accordingly.

Specifically, the folding driving mechanism further comprises a second hook pivotally connected with the front frame; after folding, the second hook is hooked on the rear frame. Due to the second hook, the front frame is hooked on the rear frame to keep the folding position after they are folded.

Specifically, the folding driving mechanism further comprises a linkage assembly for actuating the second hook to engage with or disengage from the rear frame.

More specifically, the linkage assembly comprises an trigger bar pivoted on the front frame and a connecting bar, and two ends of the connecting bar are pivotally connected to the trigger bar and the second hook respectively, a lower end of the drive rod is provided with an trigger part; before unfolding, the trigger part is driven by the trigger bar, so as to push the second hook to disengage from the rear frame. Due to the trigger part and the linkage between the trigger bar and the connecting rod, the second hook can be triggered by the trigger part while the drive rod is rotatable, so that the second hook disengages from the rear frame.

More specifically, the linkage assembly further comprises a second tension spring arranged between the front frame and the connecting bar, so as to make the second hook to hook on the rear frame automatically. By means of the second tension spring, the second hook can be locked on the rear frame automatically when the front frame and the rear frame are folded completely, so as to prevent an unexpected folding.

Specifically, the folding scooter frame further comprises an automatic actuator assembly including a linear actuator and a push shaft, an rear end of the linear actuator is pivoted on the rear frame, the push shaft is fixed to a telescopic end of the linear actuator, and the drive rod is driven by an end of the push shaft. In such a way, the drive rod is rotatable automatically during the folding and unfolding operations.

Preferably, the folding scooter frame further comprises a manual actuator assembly including a lever and a locking member, a second elongated slot is provided at a middle of the lever to allow the center shaft to pass through, a locking pin is provided at a lower end of the lever, a third elongated slot is provided at the drive rod, and the locking pin is inserted into the third elongated slot; the locking member is pivoted on the rear frame by means of the center shaft and connected with the push shaft, a notch is provided at a lower end of the locking member to engage with the locking pin. By means of the lever, the locking pin can be disengaged from the locking member by operating the lever, so that the drive rod is beyond control of the automatic actuator assembly, thereby manual driving is achieved and manual folding and unfolding is achieved accordingly.

Preferably, a third tension spring is arranged between the locking pin and the center shaft, thereby maintaining an engagement between the locking pin and the notch. Due to the third tension spring, the locking pin can be engaged with the notch, so that the drive rod can be driven by the automatic actuator assembly under the normal state, to achieve the automatic folding and unfolding.

DETAILED DESCRIPTION OF ILLUSTRATED EMBODIMENTS

A distinct and full description of the technical solution of the present invention will follow by combining with the accompanying drawings.

Figure 1:
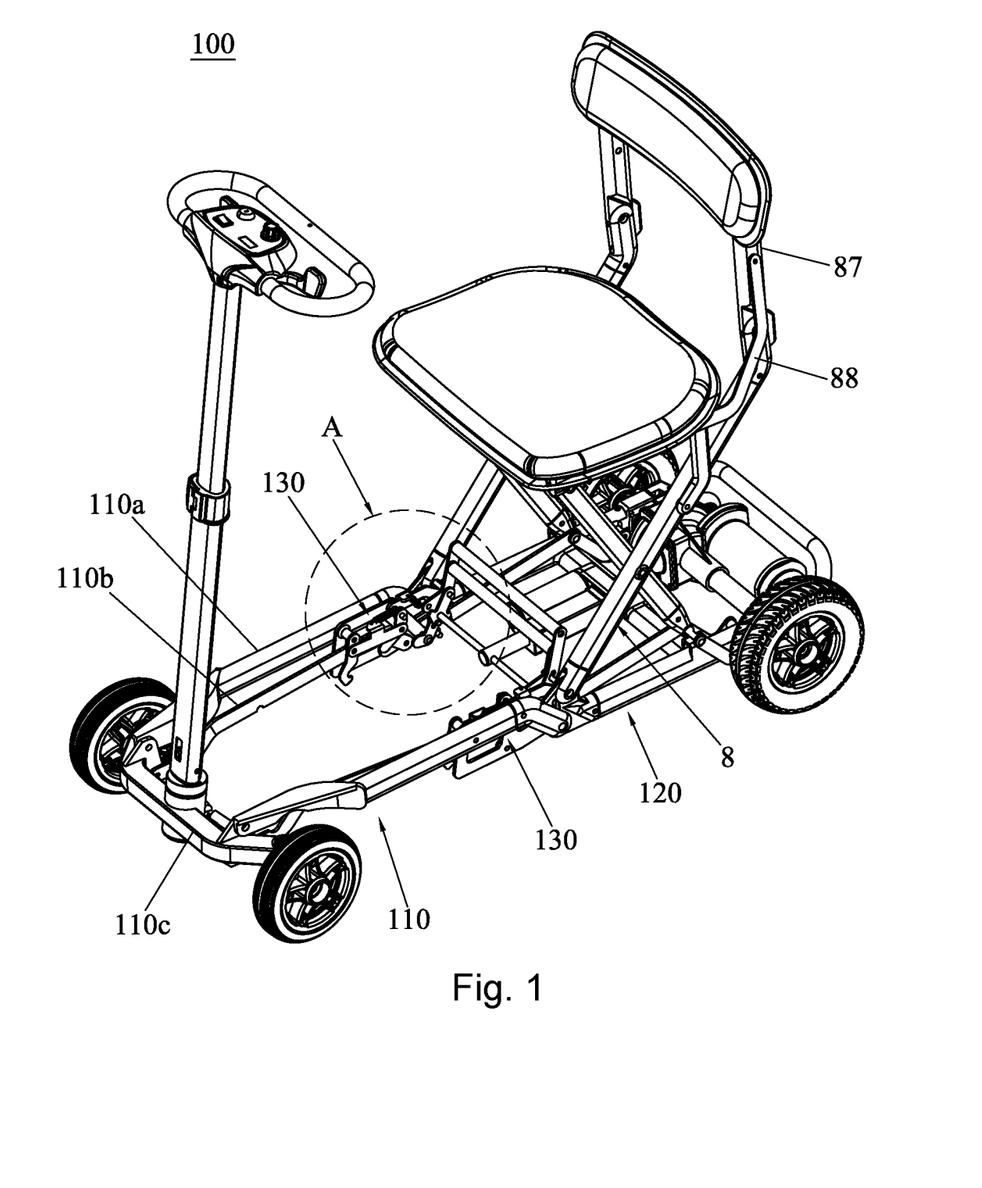
FIG. 1 is a perspective view of a folding scooter frame under an unfold status according to one embodiment of the present invention.

Referring to FIG. 1, the folding frame 100 includes a front frame 110, a rear frame 120 and a folding drive mechanism 130, the front frame 110 is pivotally connected with the rear frame 120, and the folding device mechanism 130 is arranged between the front frame 110 and the rear frame 120. Specifically, the front frame 110 includes a front beam 110a, a front bar 110b and a front cross bar 110c, a rear end of the front beam 110a is pivotally connected to a front end of the rear frame 120, a front end of the front beam 110a is pivotally connected to the front cross bar 110c, a front end of the front bar 110b is pivotally connected to the front cross bar 110c, and the front beam 110a is provided with an installing frame 110d. More specifically, the front frame 110 and the rear front 120 are symmetrical, thus the folding drive mechanism 130 is configured at opposite inner sides of the folding frame 100.

Figure 2:
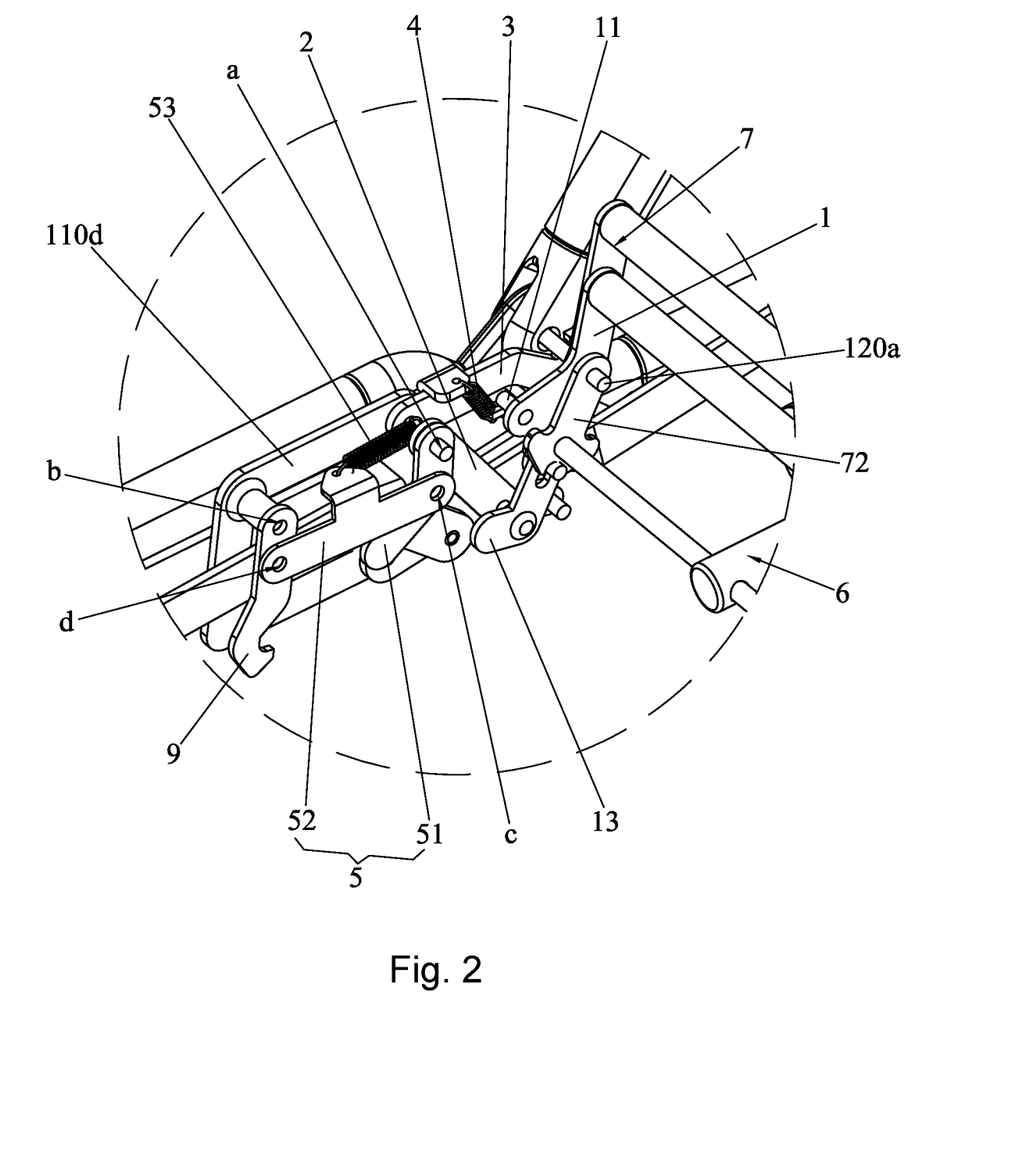
FIG. 2 is an enlarged view of the A portion shown in FIG. 1.
Figure 3:
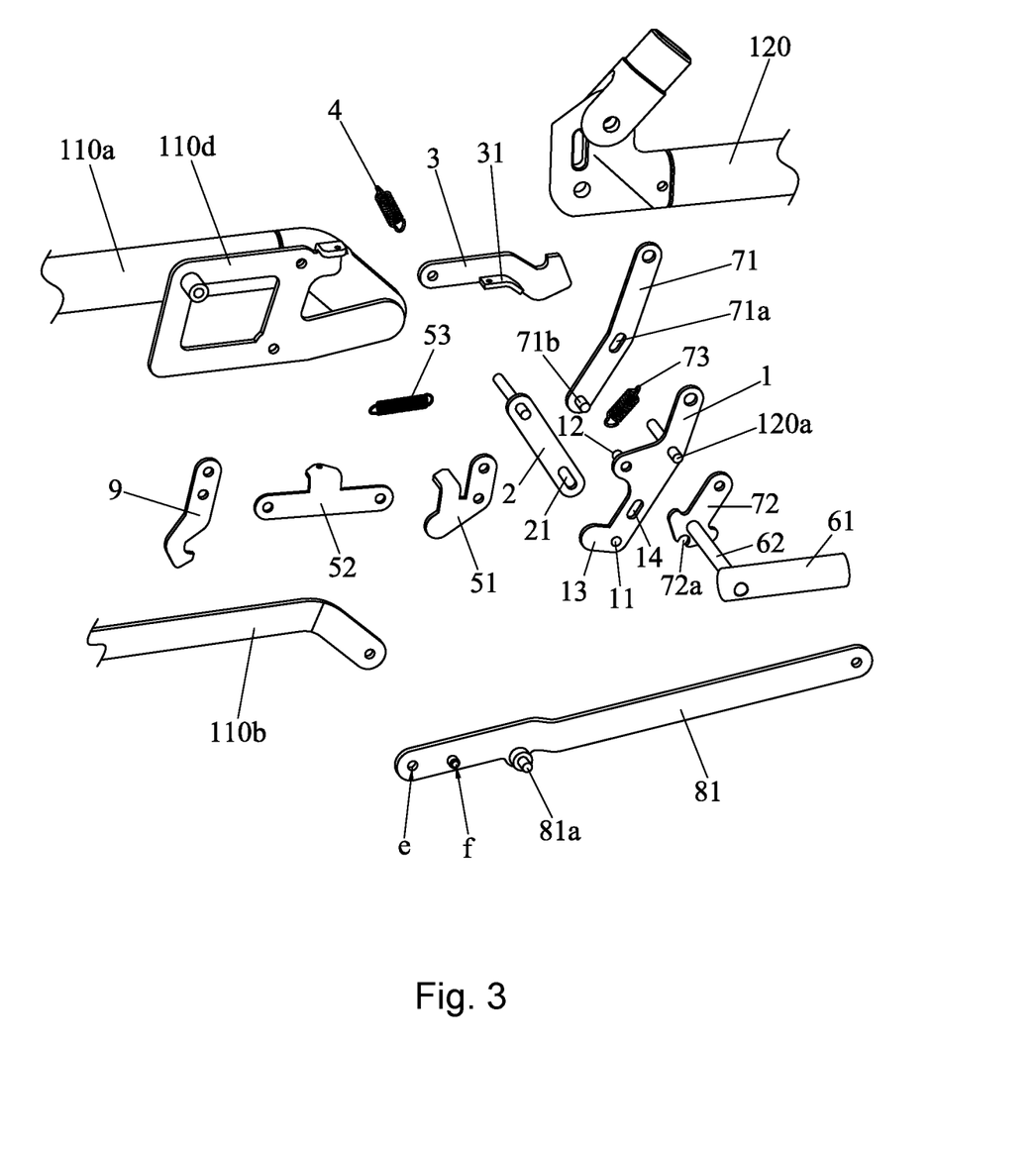
FIG. 3 is an exploded view of a folding drive mechanism according to one embodiment of the present invention.

Referring to FIGS. 1 to 3, the folding drive mechanism 130 includes a drive rod 1, a pull rod 2, a first hook 3 and a first tension spring 4. Specifically, the drive rod 1 is pivoted on the rear frame 120 by means of a center shaft 120a, one end of the pull rod 2 is pivoted on the installing frame 110d, with a pivot a; the other end of the pull rod 2 is provided with an elongated slot 21 in which a first shaft pin 11 at a lower end of the drive rod 1 is slidably inserted. The first hook 3 is pivoted on the installing frame 110d, with the pivot a, namely the first hook 3 and the pull rod 2 are pivotally connected at the same pivot axis, another end of the first hook 3 is hooked on the rear frame 120, specifically hooked on the center shaft 120a. A second shaft pin 12 is provided at the middle of the drive rod 1, a pressing portion 31 is extended from the middle of the first hook 3, and the second shaft pin 12 is pressed against the pressing portion 31. The first tension spring 4 is configured between the front frame 110 and the first hook 3 to provide a pull force, by means of the first tension spring 4, the first hook 3 can hook on the center shaft 120a automatically when the front frame 110 and the rear frame 120 are completely unfolded, so that the rear frame 120 can be locked thereby preventing an unexpected folding and improving safety accordingly.

Referring to FIGS. 2-3 and 4-7, the folding drive mechanism 130 further include a second hook 9 and a linkage assembly 5 for actuating the second hook 9 to engage with or disengage from the rear frame 120. Specifically, the second hook 9 is pivoted on the installing frame 110d, with a pivot b. After folding, the second hook 9 can be hooked on the rear frame 120 to lock the front frame 110 and the rear frame 120 at the folding status. Specifically, the rear frame 120 is provided with a seat folding support 8, a linkage bar 81 is provided at the seat folding support 8, and a engaging portion 81a is formed on the linkage bar 81 to engage with the second hook 9. The linkage assembly 5 includes a trigger bar 51, a connecting bar 52 and a second tension spring 53. Specifically, the trigger bar 51 is bent and pivoted on the installing frame 110d, with a pivot a, namely the trigger bar 51 and the pull rod 2 are pivotally connected at the same pivot axis. The ends of the connecting bar 52 are pivotally connected to the middles of the trigger bar 51 and the second hook 9 respectively, with pivots c and 6. As shown, the lower end of the drive rod 1 is provided with a trigger part 13, before the frame 100 is unfolded, the trigger bar 51 is actuated under the pressing action of the trigger part 13, so as to push the second hook 9 to disengage from the rear frame 120. A third tension spring 53 is formed between the front frame 120 and the connecting bar 52, so as to make the second hook 9 hook on the rear frame 120 automatically once the front frame 110 is folded relative to the rear frame 120. By means of the trigger part 13 and the linkage between the trigger bar 51 and the connecting bar 52, the second hook 9 can be firstly actuated by the trigger part 13, while the drive rod is rotated initially, so that the second hook 9 disengages from the rear frame 120 to unlock the rear frame 110 and the front frame 120 before they are unfolded. By means of the second tension spring 53, the second hook 9 can be locked on the rear frame 120 automatically when the front frame 110 and the rear frame 120 are folded completely, so as to prevent an unexpected folding.

Referring to FIGS. 1-5, the folding drive mechanism further includes an automatic actuator assembly 6 and a manual actuator assembly 7, and the automatic actuator assembly 6 includes a linear actuator 61 and a push shaft 62, the rear end of the linear actuator 61 is pivoted on the rear frame 120, the push shaft 62 is fixed on the telescopic end of the linear actuator 61, and the two ends of the push shaft 62 is adapted for actuating the drive rod 1 to swing. By means of the linear actuator 61 and the push shaft 62, the drive rod 1 is capable of swinging while the frame is folding or unfolding, thus the operation is quite convenient. The manual actuator assembly 7 includes a lever 71 and a locking member 72, a second elongated slot 71a is provided at the middle of the lever 71 and adapted for engaging with the center shaft 120a, and a locking pin 71b is provided at the lower end of the lever 71. A third elongated slot 14 is provided at the drive rod 1, and the locking pin 71b is inserted in to the elongated slot 14. The locking member 72 is pivoted on the rear frame 120 by means of the center shaft 120a and connected with the push shaft 62. A notch 72a is formed on the lower portion of the locking member 72 to engage with the locking pin 71b. Further, the manual actuator assembly 7 includes a third tension spring 73 arranged between the locking pin 71b and the center shaft 120a, so that the engagement between the notch 72a and the locking pin 71b is kept. By means of the lever 71, the locking pin 71b can be disengaged from the locking member 72 by operating the lever 71, so that the drive rod 1 is beyond control of the automatic actuator assembly 6, thereby manual driving is achieved and manual folding and unfolding is achieved accordingly. Due to the third tension spring 73, the locking pin 71b can be engaged with the notch 72a, so that the drive rod 1 can be driven by the automatic actuator assembly 6 under the normal state, to achieve the automatic folding and unfolding.

Figure 8:
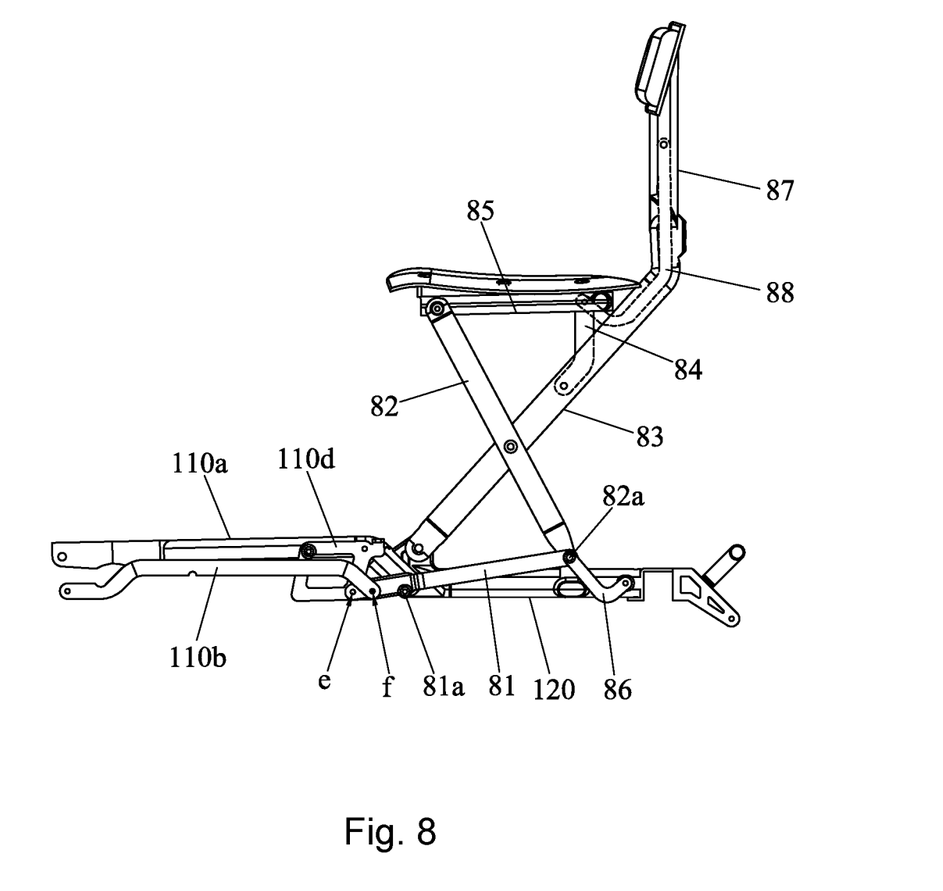
FIG. 8 is a structure view of a folding seat support of the folding scooter frame according to one embodiment of the present invention.
Figure 9:
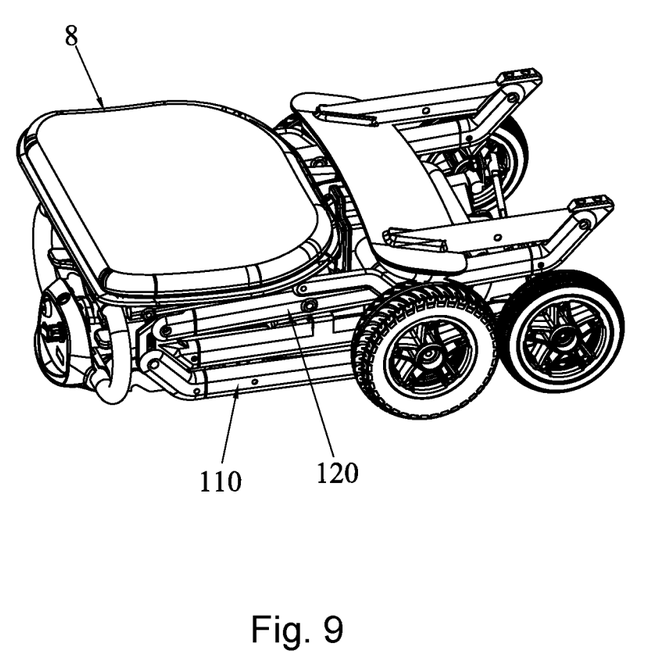
FIG. 9 is another perspective view of the folding scooter frame after complete folding.

As shown in FIG. 1 and FIG. 8, the folding scooter support 8 further includes a folding seat support 8 having a linkage rod 81, a first support rod 82, a second support rod 83, a third support rod 84, a seat 85, a limiting rod 86, a backrest rod 87 and a backrest pull rod 88. The first support rod 82 is pivotally connected with the second support rod 83 at an X shape, the third support rod 84 is bent, a lower end of the third support rod 84 is pivotally connected with the second support rod 83, two ends of the seat 85 are pivotally connected with upper ends of the first support rod 82 and the third support rod 83 respectively, a lower end of the second support rod 83 is pivotally connected with the rear frame 120. The front end of the linkage rod 81 has two pivot points e and f, specifically, the pivot point e is pivotally connected with the mounting frame 110d, the pivot point f is pivotally connected with the rear end of the front rod 110b. The rear end of the linkage rod 81 is pivotally connected with the lower end of the first support rod 82 via a pivot shaft 82a; when the folding seat support 8 is unfolded, the pivot shaft 82a is supported on the upper surface of the rear frame 120. The linkage rod 81 is rotatable as the front frame 110 is folded, thereby driving the first support rod 82, the second support rod 83, the third support rod 84 to fold. In addition, the lower end of the backrest rod 87 is pivotally connected with the second support rod 83, one end of the backrest pull rod 88 is pivotally connected on the backrest support 87, and the other end of the backrest pull rod 88 is pivotally connected on the seat 85. By setting the backrest pull rod 88, the seat 85 can drive the backrest pull rod 88 to fold when the seat 85 is folding. By setting the linkage 81 which is connected with the front frame 110, the linkage 81 can be driven to swing when the front frame 110 is folding or unfolding, so as to fold or unfold the seat 85, thereby the folding and unfolding operations are simplified and convenient. One end of the limiting rod 86 is fixed to the pivot shaft 82a, and the other end of the limiting rod 86 is pivotally connected with the rear frame, preferably, the limiting rod 86 is a bended structure. Further, the linkage 81 is provided with an engaging portion 81a to engage with the second hook 9.

In the above embodiment, the backrest pull rod can be replaced by a pull tab (not shown), one end of which is connected to the seat 85, another end of which is connected to the backrest rod 87. In such a way, the backrest can be folded by means of the pull tab, when the seat 85 is folded.

In conclusion, detailed working principle of the folding frame 100 of the present invention follow, in combination of FIGS. 1, 4, 6 and 9.

When the folding frame 100 is in unfold position, both of the front beam 110a and the rear frame 120 are horizontal substantially, and the telescopic end of the linear actuator 61 is protruded, the first shaft pin 11 is located within the lower end of the first elongated slot 21, the locking pin 71b is located within the lower end of the second slot 71a to engage with the notch 72a, and the first hook 3 is hooked on the center shaft 120a to lock the front frame 110 and the rear frame 120. At this time, the first and the second support rods 82, 83 of the folding seat support 8 are crossed, the pivot shaft 82a is supported on the rear frame 120, and the seat 85 is unfolded at the horizontal status to allow the driver to seat.

Figure 4:
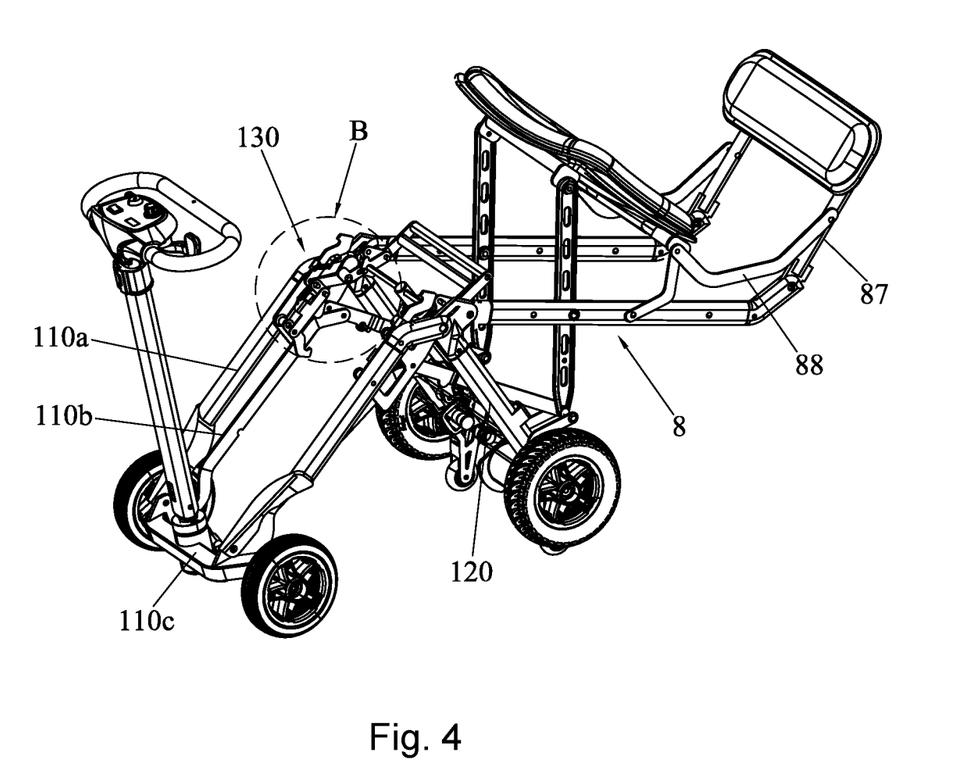
FIG. 4 is a schematic view of the folding scooter frame during folding.
Figure 5:
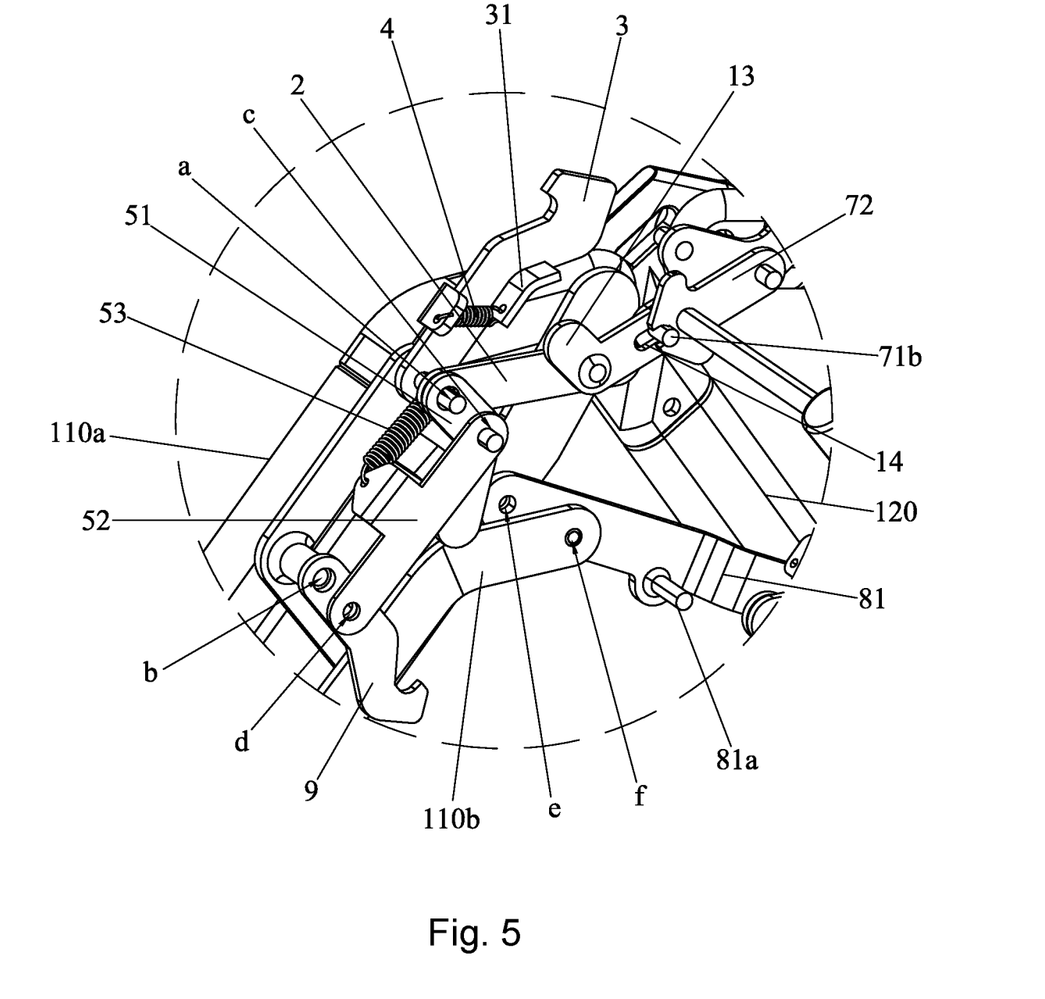
FIG. 5 is an enlarged view of the B portion shown in FIG. 4.
Figure 6:
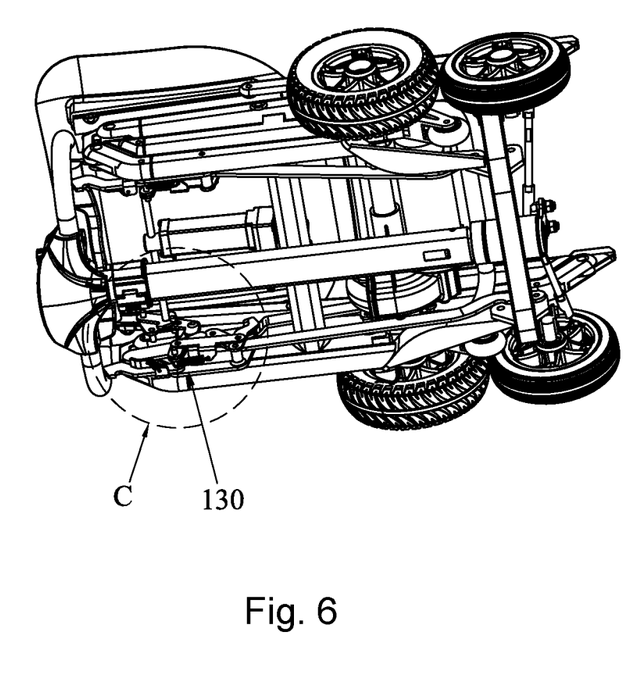
FIG. 6 is a schematic view of the folding scooter frame after complete folding.
Figure 7:
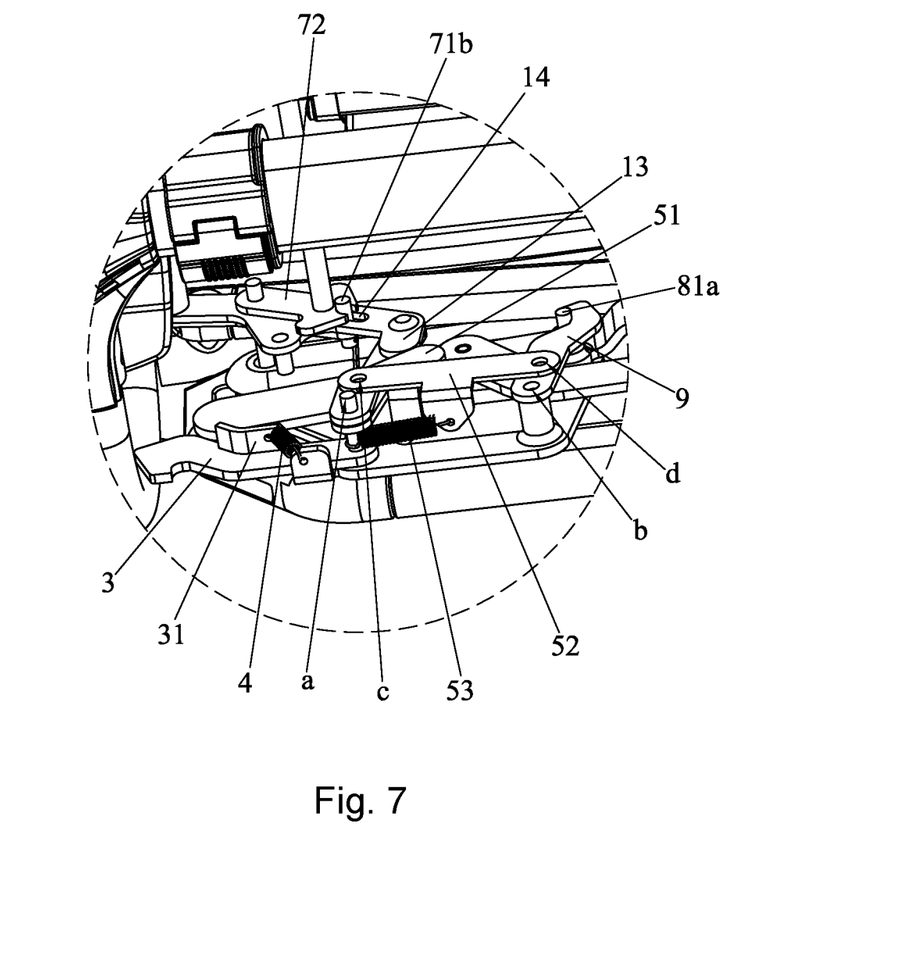
FIG. 7 is an enlarged view of the C portion shown in FIG. 6.

When there is a need to fold the folding frame 100 automatically, starting up the linear actuator 61 to make its telescopic end withdraw, thus the push shaft 62 is actuated to move, accordingly the lower end of the drive rod 1 is pivoted around the center shaft 120 under the linkage of the locking member 72 and the locking pin 71b. During the initial rotation of the drive rod 1, the first shaft pin 11 sliders from the upper end of the first elongated slot 1 to the lower end, thus the pull rod 2 will not be actuated by the drive rod 1. On the other hand, the second shaft pin 12 follow the drive rod 1 to move downwards, so as to push against the pressing portion 31 of the first hook 3, thereby causing the first hook to disengage from the center shaft 120a. When the first shaft pin 11 reaches to the lower end of the first elongated slot 21, the first hook 3 completely disengages from the center shaft 120a; at this time, continuing to pivot the drive rod 1 to cause the pull rod 2 to move, thus the front frame 110 is pivoted relative to the rear frame 120, thereby folding. During the folding of the front frame 110 and the rear frame 120, the linkage rod 81 is driven to move backwards due to the front frame 110, the rear end of the linkage rod 81 is pushed against the pivot shaft 82a, causing the limiting rod 86 to swing towards the back of the folding scooter frame 100, meanwhile, the first support rod 82, the second support rod 83, the third support rod 84, the seat 85, the limiting rod 86, the backrest rod 87 and the backrest pull rod 88 are driven to fold. Once the front frame 110 and the rear frame 120 are folded completely, the folding seat support 8 is folded as well, at this time, the second hook 9 is hooked on the engaging portion 81a due to the action of the second tension spring 53, so as to lock the folding frame 100 in the folding position.

When there is a need to unfold the folding frame 100, starting up the linear actuator 61 to make its telescopic end protrude, thus the push shaft 62 is actuated to move, accordingly the lower end of the drive rod 1 is pivoted around the center shaft 120 under the linkage of the locking member 72 and the locking pin 71b. During the initial rotation of the drive rod 1, the first shaft pin 11 sliders from the lower end of the first elongated slot 1 to the upper end, thus the pull rod 2 will not be actuated by the drive rod 1. On the other hand, the trigger bar 51 is pushed against the trigger part 13 of the drive rod 1, thus the trigger bar 51 is pivoted to actuate the connecting bar 52 to pivot accordingly, and in turn, the second hook 9 disengages from the engaging portion 81a. When the first shaft pin 11 reaches to the upper end of the first elongated slot 21, the second hook 9 completely disengages from the engaging portion 81a; at this time, continuing to pivot the drive rod 1 to cause the pull rod 2 to move, thus the front frame 110 is pivoted relative to the rear frame 120, causing the front frame 110 to be far from the rear frame 12, thereby unfolding. Meanwhile, the linkage rod 81 drives the first support rod 82, the second support rod 83, the third support rod 84, the seat 85, the limiting rod 86, the backrest rod 87 and the backrest pull rod 88 to unfold. Once the front frame 110 and the rear frame 120 are unfolded completely, the first hook 3 is hooked on the center shaft 120a due to the action of the first tension spring, so as to lock the folding frame 100 in the unfolding position.

When there is a need to fold and unfold the folding frame 100 manually, pressing the lever 71 and then sliding it, causing the locking pin 71b of the lever 71 to slide from one end of the third elongated slot 14 to the other end to disengage from the notch 72a, thus the drive rod 1 is released from the locking member 72, that is, the drive rod 1 will not be controlled by the linear actuator 61. At this time, user may handle the drive rod 1 to fold or unfold the frame 100. Similarly, the working principle of the folding frame 100 by manual is the same with that by electric, thus is omitted here.

In comparison with the prior art, the drive rod 1 is pivoted on the rear frame 120, the pull rod 2 is pivoted on the front frame 110, the first elongated slot 21 is formed at the end of the pull rod 2, and the first shaft pin 11 of the drive rod 1 is inserted into the first elongated slot 21. Further, the first hook 3 is hooked on the rear frame 120, and the second shaft pin 12 of the drive rod 1 is pressed against the first hook, thus the front frame 110 and the rear frame 120 are locked in the unfold position. When folding, the drive rod 1 is driven to swing to cause the first hook 3 to disengage from the rear frame 120, thereby unlocking the front frame 110 and the rear frame 120; continuing to swing the drive rod 1, the pull rod 2 is linked, so that the front frame 110 and the rear frame 120 can be folded. Additionally, by configuring the linkage rod 81, connecting the front end of the linkage rod 81 with the front frame 110, and pivotally connecting the rear end of the linkage rod 81 with the first support rod 82, the linkage rod 81 is linked to swing when the front frame 110 is folded or unfolded, by this token, the folding frame 100 can be folded or unfolded quickly only by driving the drive rod 1, and the operation is simple and convenient.

Figure 10:
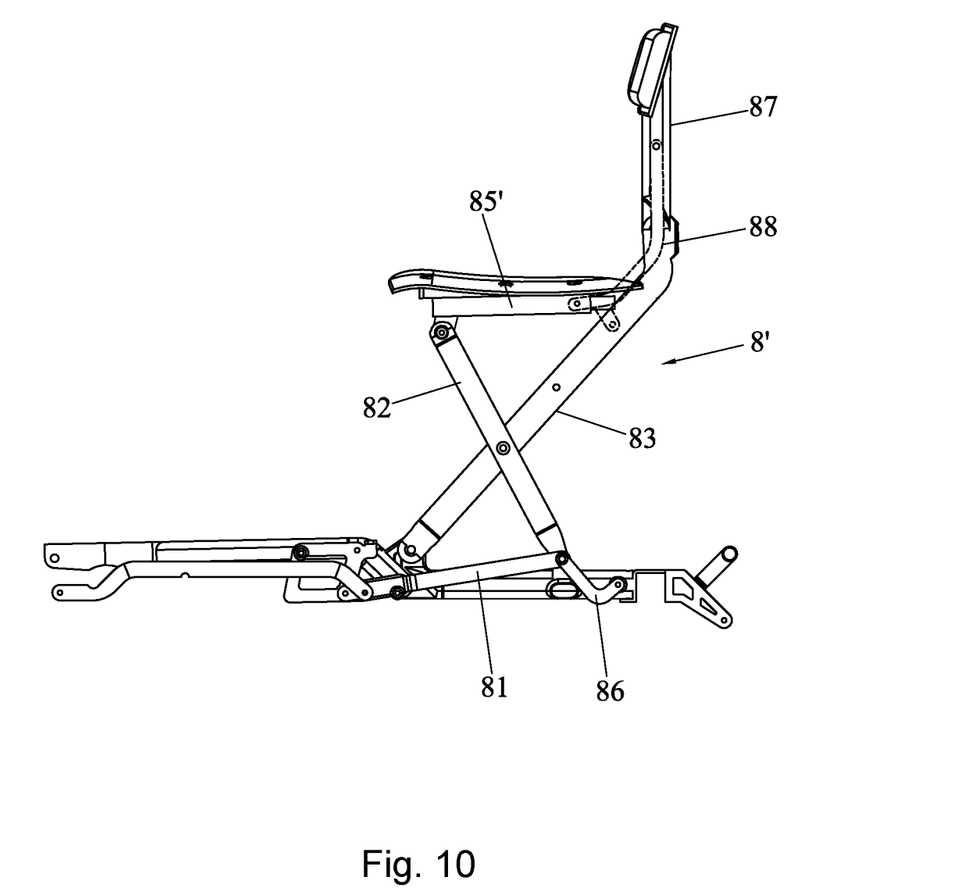
FIG. 10 is a structure view of a folding seat support of the folding scooter frame according to another embodiment of the present invention.

Referring to FIG. 10, it shows a folding seat support 8' of the folding scooter frame according to another embodiment. In this embodiment, the main structure of the folding scooter frame is similar to that of the above embodiment, difference is the folding seat support 8'. The folding seat support 8' includes the linkage rod 81, the first support rod 82, the second support rod 83, the limiting rod 86, the backrest rod 87 and the backrest pull rod 88 which are similar to the first embodiment, and further includes a telescopic seat 85' which is pivotally connected with the first support rod 81 and the second support rod 82 at its two end. A third support rod is omitted here. When folding, the upper ends of first support rod 82 and the second support rod 83 are far away from each other, so as to extend the seat 85'. Except that, other structures and the working principle of the present embodiment are same with that in the first embodiment, which are omitted here.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A folding scooter frame, comprising a front frame, a rear frame pivotally connected with the front frame, and a folding seat support frame comprising a linkage rod and a frame body, wherein the frame body comprises a first support rod and a second support rod which are pivotally connected in an X shape, a lower end of the second support rod is pivotally connected with the rear frame, the folding seat support frame further comprises a limiting rod, one end of the limiting rod is pivotally connected with the rear frame, the linkage rod has a front end connected with the front frame and a rear end driving a lower end of the first support rod of the frame body and another end of the limiting rod, and the linkage rod is rotatable as the front frame is folded, thereby driving the frame body to fold.

2. The folding scooter frame according to claim 1, wherein the front frame comprises a front beam, a front bar and a front cross bar, a rear end of the front beam is pivotally connected with a front end of the rear frame, a front end of the front bar is pivotally connected with the front cross bar, the front beam has a mounting frame, the front end of the linkage rod is pivotally connected with the mounting frame, and a rear end of the front bar is pivotally connected with the linkage rod.

3. The folding scooter frame according to claim 1, wherein the frame body further comprises a third support rod and a seat, a lower end of the third support rod is pivotally connected with the second support rod, two ends of the seat are pivotally connected with upper ends of the first support rod and the third support rod respectively, and the rear end of the rear frame is pivotally connected with a lower end of the first support rod via a pivot shaft.

4. The folding scooter frame according to claim 3, wherein another end of the limiting rod is fixed on the pivot shaft which is supported on an upper surface of the rear frame, and the limiting rod is bent.

5. The folding scooter frame according to claim 3, wherein the frame body comprises a backrest rod and a backrest pull rod, a lower end of the backrest rod is pivotally connected with the second support rod, one end of the backrest pull rod is connected with the backrest rod, and another end of the backrest pull rod is connected with the seat.

6. The folding scooter frame according to claim 1, wherein the frame body further comprises a seat, the seat is a telescopic structure, two ends of the seat are pivotally connected with upper ends of the first support rod and the second support rod respectively, and the rear end of the rear frame is pivotally connected with a lower end of the first support rod via a pivot shaft.

7. The folding scooter frame according to claim 6, wherein another end of the limiting rod is fixed on the pivot shaft which is supported on an upper surface of the rear frame, and the limiting rod is bent.

8. The folding scooter frame according to claim 6, wherein the frame body comprises a backrest rod and a backrest pull rod, a lower end of the backrest rod is pivotally connected with the second support rod, one end of the backrest pull rod is connected with the backrest rod, and another end of the backrest pull rod is connected with the seat.

9. The folding scooter frame according to claim 1, further comprising a folding driving mechanism which comprises a drive rod and a pull rod, wherein the drive rod is pivotally connected with the rear frame via a center shaft, one end of the pull rod is pivotally connected with the front frame, another end of the pull rod is pivotally connected with the drive rod to cause the drive rod to swing thereby actuating the pull rod and therefore pivoting and folding the front frame relatively to the rear frame.

10. The folding scooter frame according to claim 9, wherein the folding driving mechanism further comprises a first hook, a first elongated slot is provided at one end of the pull rod, a first shaft pin is provided at a lower end of the drive rod to insert into the first elongated slot, one end of the first hook is pivotally connected with the front frame and another end of the first hook is hooked on the front frame, and a second shaft pin is provided at a middle of the drive rod to press against the first hook; before folding, the drive rod swings to cause the second shaft pin to push the first hook to disengage from the rear frame, thereby folding the front frame relatively to the rear frame.

11. The folding scooter frame according to claim 10, wherein the folding driving mechanism further comprises a first tension spring arranged between the front frame and the first hook.

12. The folding scooter frame according to claim 9, further comprising an automatic actuator assembly including a linear actuator and a push shaft, a rear end of the linear actuator is pivoted on the rear frame, the push shaft is fixed to a telescopic end of the linear actuator, and the drive rod is driven by an end of the push shaft.

13. The folding scooter frame according to claim 12, further comprising a manual actuator assembly including a lever and a locking member, a second elongated slot is provided at a middle of the lever to allow the center shaft to pass through, a locking pin is provided at a lower end of the lever, a third elongated slot is provided at the drive rod, and the locking pin is inserted into the third elongated slot; the locking member is pivoted on the rear frame by means of the center shaft and connected with the push shaft, a notch is provided at a lower end of the locking member to engage with the locking pin.

14. The folding scooter frame according to claim 13, wherein a third tension spring is arranged between the locking pin and the center shaft, thereby maintaining an engagement between the locking pin and the notch.

15. The folding scooter frame according to claim 9, wherein the folding driving mechanism further comprises a second hook pivotally connected with the front frame; after folding, the second hook is hooked on the rear frame.

16. The folding scooter frame according to claim 15, wherein the folding driving mechanism further comprises a linkage assembly for actuating the second hook to engage with or disengage from the rear frame.

17. The folding scooter frame according to claim 16, wherein the linkage assembly comprises a trigger bar pivoted on the front frame and a connecting bar, and two ends of the connecting bar are pivotally connected to the trigger bar and the second hook respectively, a lower end of the drive rod is provided with a trigger part; before unfolding, the trigger part is driven by the trigger bar, so as to push the second hook to disengage from the rear frame.

18. The folding scooter frame according to claim 17, wherein the linkage assembly further comprises a second tension spring arranged between the front frame and the connecting bar, so as to make the second hook to hook on the rear frame automatically.

\* \* \* \* \*